United States Patent
Hochmuth et al.

(10) Patent No.: US 8,348,157 B2
(45) Date of Patent: Jan. 8, 2013

(54) DYNAMIC REMOTE PERIPHERAL BINDING

(75) Inventors: Roland M. Hochmuth, Fort Collins, CO (US); James M. King, Fort Collins, CO (US); Roy Lee Troutman, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/255,668

(22) PCT Filed: Mar. 12, 2009

(86) PCT No.: PCT/US2009/036918
§ 371 (c)(1),
(2), (4) Date: Sep. 9, 2011

(87) PCT Pub. No.: WO2010/104511
PCT Pub. Date: Sep. 16, 2010

(65) Prior Publication Data
US 2011/0315763 A1     Dec. 29, 2011

(51) Int. Cl.
*G06K 5/00* (2006.01)
(52) U.S. Cl. ......... 235/380; 235/375; 235/451; 235/492
(58) Field of Classification Search .................. 235/375, 235/380, 382, 451, 492
See application file for complete search history.

(56) References Cited

U.S. PATENT DOCUMENTS

| | | | |
|---|---|---|---|
| 6,549,934 B1 | 4/2003 | Peterson et al. | |
| 7,823,775 B2 * | 11/2010 | Kannan | 235/380 |
| 2006/0013393 A1 | 1/2006 | Ferchichi et al. | |
| 2008/0091944 A1 * | 4/2008 | von Mueller et al. | 713/168 |
| 2008/0203154 A1 * | 8/2008 | Kannan | 235/380 |
| 2009/0007248 A1 | 1/2009 | Kovaleski | |
| 2010/0096452 A1 * | 4/2010 | Habraken | 235/382 |
| 2010/0325428 A1 * | 12/2010 | Satoh | 713/156 |
| 2011/0017821 A1 * | 1/2011 | Kannan | 235/382 |
| 2011/0283002 A1 * | 11/2011 | King | 709/227 |

FOREIGN PATENT DOCUMENTS

| | | | |
|---|---|---|---|
| KR | 10-2002-0039703 A | 5/2002 |
| KR | 10-2003-0075809 A | 9/2003 |

OTHER PUBLICATIONS

Hochmuth, Roland M., et al., "Notification of Transmittal of the International Search Report and the Written Opinion of the International Searching Authority, or the Declaration," International Application No. PCT/US2009/036918 filed Mar. 12, 2009, Date of Mailing: Nov. 25, 2009, pp. 1-12.
IPRP mailed Sep. 22, 2011, in counterpart PCT application.

* cited by examiner

*Primary Examiner* — Tuyen K Vo (57) ABSTRACT

Disclosed are systems and methods of dynamic remote peripheral binding. In one embodiment, such a system includes a local system (102) configured to bind a smart card reader (110) to the local system (102). The smart card reader (110) is configured to extract data from a smart card (112). The system includes a local authentication engine (120) that prompts the user for user authentication information associated with the smart card (112). The local authentication engine (120) authenticates that the user is associated with the smart card (112), is authorized to access the user credentials and extracts them from the smart card (112). A remote access client (116) module establishes a remote session (121) from the local system (102) to a remote system (104). The local system (102) unbinds the smart card reader (110) from the local system (102) and binds the smart card reader (110) to the remote system (104).

18 Claims, 4 Drawing Sheets

DYNAMIC REMOTE PERIPHERAL BINDING

BACKGROUND

An operating system (commonly abbreviated OS and O/S) is the software component of a computer system that is responsible for the management and coordination of activities and the sharing of the resources of the computer. The operating system acts as a host for application programs that are run on the machine. As a host, one of the purposes of an operating system is to handle the details of the operation of the hardware. This relieves application programs from having to manage these details and makes it easier to write applications. Almost all computers, including hand-held computers, desktop computers, supercomputers, and even modern video game consoles, use an operating system of some type. A thin-client is an example of a desktop computer or local system that may run a version of an operating system that is not as powerful as the standard desktop operating system that is used to connect to other computers. On the local system a remote access client software may be initialized to connect to a remote system.

BRIEF DESCRIPTION

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications, and equivalents.

DETAILED DESCRIPTION

Single sign-on (SSO) is a method of access control used by remote systems that enables a user to log in once and gain access to the resources of multiple software systems or services without being prompted to log in again. Single sign-off is the reverse process whereby a single action of signing out terminates access to multiple software systems. As different applications and resources support different authentication mechanisms, single sign-on internally translates and stores different credentials compared to what may be used for initial authentication.

Example embodiments of SSO may implement centralized authentication servers that all other applications and systems utilize for authentication purposes, and may combine this with techniques to ensure that users do not actively have to enter their credentials more than once.

Enterprise single sign-on (E-SSO) systems may be designed to minimize the number of times that a user types an ID and password to sign into multiple applications. The E-SSO solution automatically logs users in, and acts as a password filler where automatic login is not possible. Each client may be given a token that handles the authentication. In an alternative embodiment of an E-SSO solution, each client has E-SSO software stored on the computer to handle the authentication. On the server side, an E-SSO authentication server may be integrated into the enterprise network.

In addition, smart card authentication may be employed to provide a hardware level security element in SSO and/or E-SSO systems. In a remote visualization system, a system in which, for example, a local system can access a remote desktop or other remotely-run application which is displayed on the local system, embodiments of the disclosure can employ smart card authentication for access to the local system as well as the remote system. This disclosure also presents systems and methods where peripheral devices such as a smart card reader can dynamically bind to local systems and/or remote systems.

In the context of this disclosure, in some embodiments, when a peripheral device binds to a local system and/or remote system, the system to which the peripheral device binds can have exclusive access to the peripheral. In other embodiments, when a peripheral device binds to a local system and/or remote system, the system to which the peripheral binds can have non-exclusive access to the device. It should be appreciated that a peripheral device can bind to a local system via a local connection such as a USB connection, serial connection, or the like. Alternatively, a peripheral can bind to a remote system via a local system that is in communication with the remote system over a network. In some embodiments, both local and remote systems can use peripheral devices for user authentication. For example, smart card readers can be used locally by a local system for user authentication purposes as well as by remote systems for authentication by a remote access server.

Figure 1:
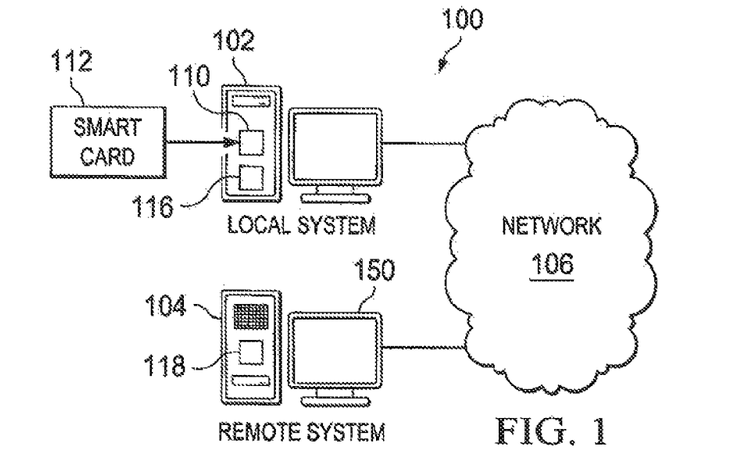
FIG. 1 illustrates a networked environment in accordance with an embodiment of the disclosure.

Accordingly, with reference to FIG. 1, shown is one example of a networked environment 100 according to an embodiment of the disclosure. In one embodiment, a local system 102 is configured to communicate with a remote system 104. In the depicted embodiment, the local system 102 is further configured to communicate with a network 106. Likewise, the remote system 104 can be configured to communicate with the network 106, thereby facilitating communication between the local system 102 and remote system 104. The network 106 may include, for example, any type of network environment such as the Internet, intranets, local area networks, wide area networks (WANs), wireless networks, cellular networks, phone networks, or other suitable networks or combination of networks.

The depicted local system 102 can include a personal computer, a thin-client computing device, or other computing system as can be appreciated. The remote system 104 can include a personal computer, server, authentication device, or other computing system as can be appreciated. In one embodiment, the local system 102 can include a thin client computing device configured to access computing resources, storage resources, software resources, and other resources housed within or available to the remote system 104. Accordingly, users of the networked environment 100 can access resources of the remote system 104 from various locations, and the remote system 104 can maintain profile information, preferences, and other data regarding the user to allow a user to access software applications housed within or available to the remote system 104. In this way, the remote system 104 can assign a virtual desktop to various users, which can be consistent regardless of the location of the user. In addition, such a system facilitates deployment, maintenance, and replacement of local system(s) 102, as thin client devices can be deployed as local systems 102 with significant computing resources required by users residing on or accessible to the remote system 104. Such architecture can make significant computing resources available to the local systems 102 depending on the needs of a user, while facilitating the use of low cost thin client devices as local systems 102 in the networked environment 100.

The local system 102 can further include a peripheral device attached thereto via universal serial bus (USB), Ethernet, IEEE-1394, serial, and/or parallel ports or other connection standards as can be appreciated. In one embodiment, the peripheral device includes a smart card reader 110 configured to access, read, and/or write a smart card 112. Accordingly, in one embodiment, the local system 102 can accept and access a smart card 112 of a user via the smart card reader 110, where the smart card 112 is encoded with various information about the user. Such information can include, but is not limited to: a user credential, authorization token, public key, private key or other authentication or user data as can be appreciated. Data encryption and/or decryption can also be employed to store and/or extract certain data from the smart card 112. In one embodiment, the smart card 112 can include unencrypted data as well as encrypted data. The unencrypted data can include less sensitive data such as a user name, public key, etc., while the encrypted data can include more sensitive data such as a password, user credential, private key, etc.

Accordingly, the smart card reader 110 can bind to the local system 102 and facilitate use of a smart card 112 to authenticate a user to the local system 102. In addition, the smart card reader 110 can bind to the remote system 104 via the local system 102 and the network 106. Therefore, according to an embodiment of the disclosure, a smart card reader 110 accessed by a local system 102 can bind to the remote system 104 to facilitate authentication of the user to the remote system 104. The above functionality is but one example of an embodiment according to the disclosure, as it should be appreciated that any peripheral device can bind to the local system 102 as well as to the remote system 104. Accordingly, the local system 102 and remote system 104 can access any type of peripheral device coupled to the local system 102.

Figure 2:
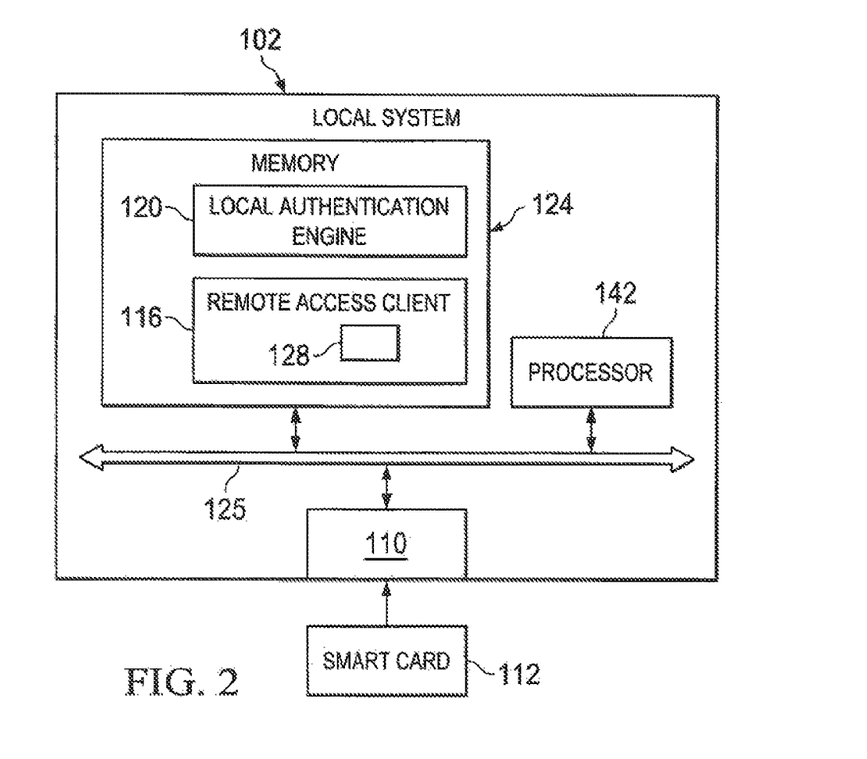
FIG. 2 is a block diagram of a local system of FIG. 1 from the networked environment of FIG. 1 in accordance with an embodiment of the disclosure.

With reference to FIG. 2, shown is one example of a local system 102 according to an embodiment of the disclosure. FIG. 2 depicts a local system 102 having a memory 124 and a processor 142 configured to execute various software components to facilitate authentication of a user employing a smart card 112 accessed by a smart card reader 110. For example, the memory 124 and processor 142 can communicate with a data bus 125, with which the smart card reader 110 can also communicate. Accordingly, upon insertion of a smart card 112 in the smart card reader 110, a peripheral device event can be generated by the smart card reader 110, which can be handled by a local authentication engine 120, which, in one embodiment, is stored in memory 124 and executable by the processor 142. The local system 102 executes the local authentication engine 120 to extract various user data from a smart card 112 in order to authenticate and/or identify a user to which the smart card 112 belongs and/or is assigned.

In one embodiment, the local authentication engine 120 of the local system 102, upon entry of a smart card 112 in the smart card reader 110, can authenticate the user and provide access to the local system 102. In other words, the local authentication engine 120 can grant access to the local system 102 for a user if the user possesses a smart card having proper user credentials stored thereon. In another embodiment, the local authentication engine 120 can prompt a user for additional authentication information such as a password, personal identification number, or other user provided authentication information. In other words, the local authentication engine 120 can provide an additional layer of security by prompting a user for user supplied credentials that can be verified using the data stored on the smart card 112. To facilitate the above, the smart card reader 110 binds to the local system 102 in that it is available, either exclusively or non-exclusively, to the local authentication engine 120 of the local system 102.

The local system 102 can further execute a remote access client 116 in order to facilitate communication between the local system 102 and a remote system 104. Accordingly, reference is now made to FIG. 3, which depicts a local system 102 in communication with a remote system 104. In order to facilitate communication between the local system 102 and remote system 104, the local system 102 can execute a remote access client 116. Likewise, the remote system 104 can execute a remote access server 132 configured to communicate with the remote access client 116 to facilitate such functionality. The local system 102 and/or remote system 104 can establish a remote session 121 for a user wishing to gain access to the remote system 104 via the local system 102. The remote session 121 can include various user profile information, preferences, and other data facilitating virtual desktop and/or remote access functionality for various users as noted above in reference to FIG. 1.

Figure 3:
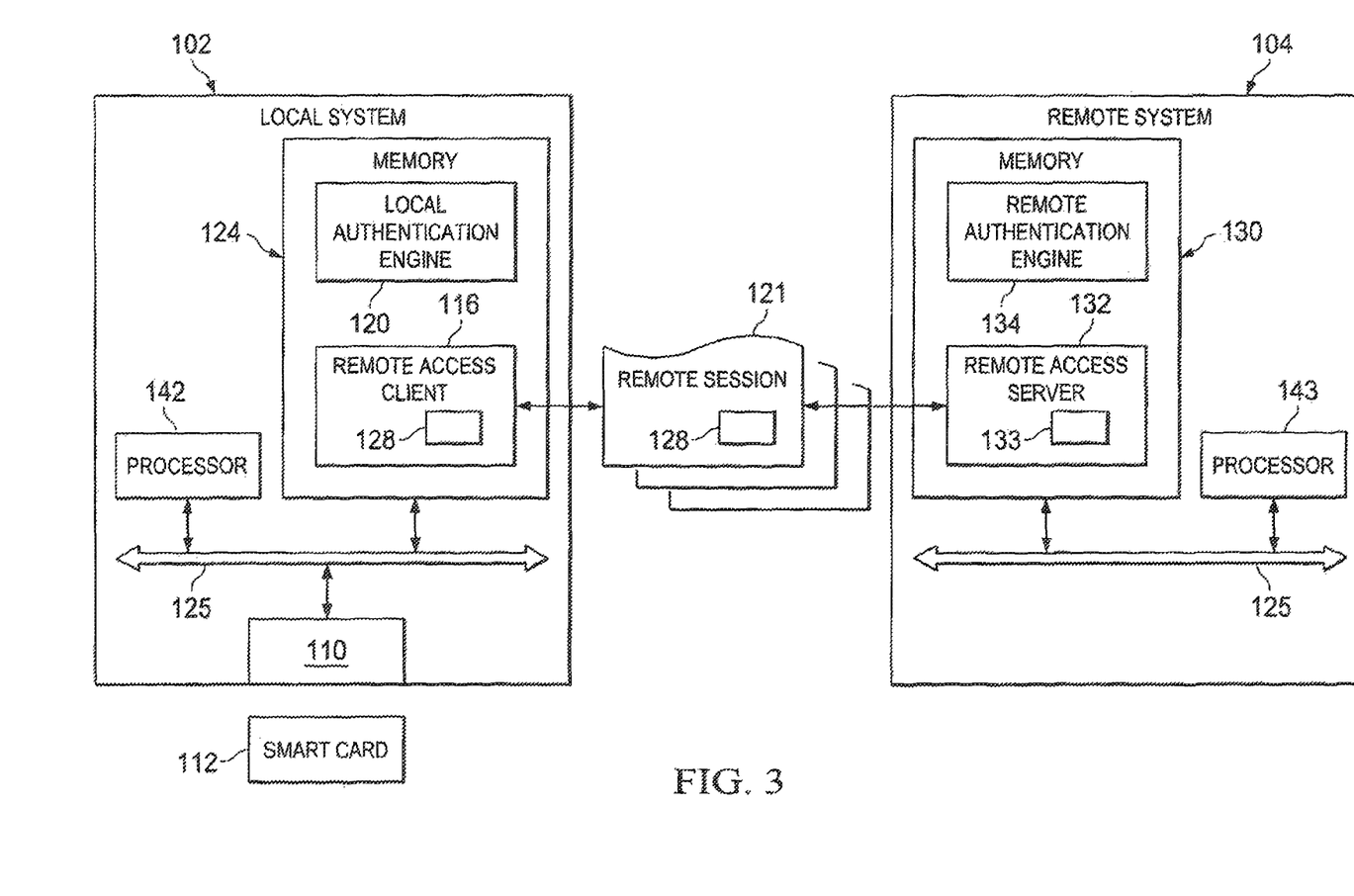
FIG. 3 is a block diagram of a local system of FIG. 1 in communication emote system of FIG. 1 in accordance with an embodiment of the disclosure.

In one embodiment, upon insertion of a smart card 112 in the smart card reader 110 of the local system 102, the smart card reader 110 can trigger an event that can be handled by the remote access client 116. Accordingly, the remote access client 116 can establish a remote peripheral session 128 corresponding to a remote session 121 established for a user, which allows the remote access client 116 to extract and/or access information from the smart card 112 via the smart cart reader 110 as noted above. The remote access client 116 can communicate data regarding the smart card 112 and smart card reader 110 within the remote peripheral session 128 and remote session 121 to the remote access server 132 stored in a memory 130 and executed by a processor 143.

The remote access server 132 can accordingly establish a server based remote peripheral session 133 in the remote system 104. In one embodiment, the server based remote peripheral session 133 can give the remote system 104 exclusive access to the smart card 112 and smart card reader 110, thereby unbinding the smart card reader 110 from the local system 102 and binding the smart card reader 110 to the remote system 104. Upon binding of the smart card reader 110 to the remote system 104, a remote authentication engine 134 can extract data regarding a user encoded on the smart card 112 in order to authenticate the user. In one embodiment, a user can present a smart card 112 to the local system 102, which can establish a remote session 121 having a remote peripheral session 128 to facilitate a physical security layer that can be imposed on top of a software password authentication scheme.

Accordingly, a server based remote peripheral session 133 can give exclusive access to the smart card reader 110 to the remote system 104, and the remote authentication engine 134 can authenticate a user's credentials, which may be stored on and extracted from the smart card 112. The remote authentication engine 134 can also prompt a user for additional authentication information via the remote session 121 and local system 102. As a non-limiting example, the remote authentication engine 134 can request a personal identification number, password, and/or other authentication data from a user, which can be received by the local system 102 via an input device and transmitted to the remote system 104 via the network 106. A user may terminate the remote session 121 and/or connectivity to the remote system 104, which subsequently unbinds the smart card reader 110 from the remote system 104. Accordingly, the smart card 112 and smart card reader 110 can again bind to the local system 102 upon termination of a remote session 121.

In another embodiment, the local system 102 can locally authenticate a user via the local authentication engine 120 prior to establishing a remote session 121 and/or communication with the remote system 104. Upon establishing a remote session 121, the smart card reader 110 can unbind from the local system 102 and bind to the remote system 104. Accordingly, the remote system 104 can then extract data from and/or access the smart card 112 and smart card reader 110.

Figure 4:
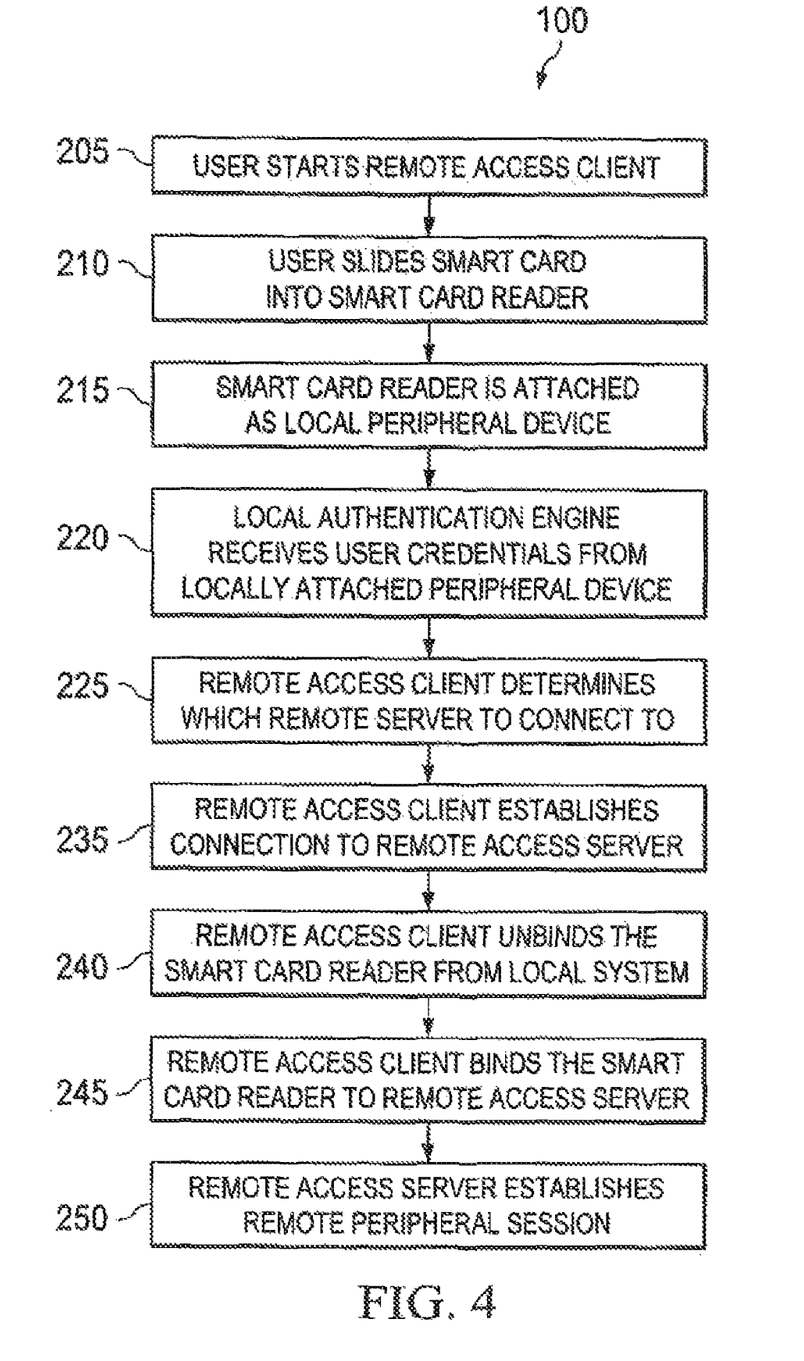
FIG. 4 is a flow diagram of an exemplary embodiment of a method of dynamic remote peripheral binding employing a local system of FIG. 1 and a remote system of FIG. 1.

Reference is now made to FIG. 4, which depicts one example of a process according to one embodiment of the disclosure. The flowchart of FIG. 2 can also be viewed as a method of remote peripheral binding. In block 205, a user can initiate a remote access client 116 (FIG. 3) in a local system 102 (FIG. 1). In block 210, the user slides, inserts, or otherwise provides access to a smart card 112 (FIG. 1) to a smart card reader 110 (FIG. 1). In block 215, the smart card reader 110 is attached as a local peripheral device of the local system 102. In block 220, the local authentication engine 120 (FIG. 3) receives notification of the smart card event and communicates with the locally attached peripheral device to extract user credentials from the smart card 112. In block 225, the remote access client 116 (FIG. 3) facilitates determination of a remote access server 132 (FIG. 3) that the user may connect to based on the user credentials returned by the smart card 112, an internet protocol address entered by the user, or other data as can be appreciated.

In block 235, the remote access client 116 establishes a connection to the remote access server. The connection may be an anonymous connection. In block 240, the remote access client 116 unbinds the smart card reader 110 from the local system 102. At this time the smart card reader is no longer available for use by software on the local system 102 other than the remote access client 116. For example, the local authentication engine 120 can no longer access the smart card reader 110. In block 245, the remote access client 116 binds the locally attached smart card reader to the remote access server 132.

In block 250, the remote access server 132 establishes a server based remote peripheral session 133 (FIG. 3) based upon a remote session 121 created for a user. The smart card reader 110 is now available to the remote access server 132 and a remote authentication engine 134 (FIG. 3). The user may then authenticate himself to the remote access server 132. If the remote access server 132 is configured to use smart card authentication, the smart card can be accessed using the server based remote peripheral session 133.

When the remote session 121 is terminated, the smart card reader 110 is unbound from the remote system 104 and bound to the local system 102. Accordingly, the smart card reader 110 can be available for subsequent reconnects to the remote system 104. Accordingly, the smart cart reader 110 is available for use by the local system 102, as the remote system 104 has released its use thereof. Although the above method discusses the use of smart cards as examples, it should be appreciated that the systems and methods disclosed herein can apply to any peripheral device to which a local system 102 and a remote system 104 may require access and/or exclusive access.

Figure 5:
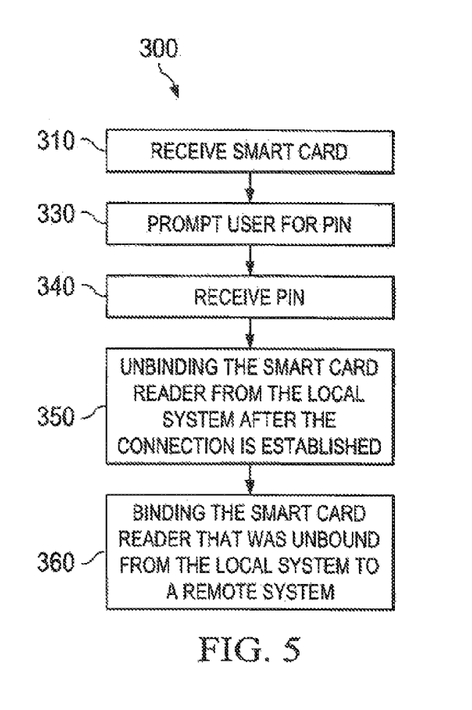
FIG. 5 is a flow diagram of an alternative exemplary embodiment of a method of dynamic remote peripheral binding employing a local system of FIG. 1 and a remote system of FIG. 1.

Referring to FIG. 5, flow diagram 300 provides one example of an embodiment of a method for remote peripheral binding in accordance with the disclosure. In block 310, the local system 102 (FIG. 1) receives a smart card 112 (FIG. 1) in a smart card reader 110 (FIG. 1). In the absence of a remote session 121 established by a remote access client 116 (FIG. 1) in the local system 102, the smart card reader 110 is bound to the local system 102. In block 330, the user can be prompted for a personal identification number (PIN) or other authentication information. A user may enter such authentication information in the local system 102 via an input device such as a keyboard, mouse, etc. In block 340, the local system 102 receives the PIN and a remote session 121 (FIG. 3) is established. In block 350, the smart card reader is unbound from the local system after a connection is established between a remote access client 116 (FIG. 3) in the local system 102 and a remote access server 132 (FIG. 3) in the remote system 104 (FIG. 1). In block 360, the smart card reader is unbound from the local system 102 and bound to the remote system 104 via the remote access client 116 and remote access server 132, which facilitate creation of a server based remote peripheral session 133 in the remote system 104.

Example embodiments of methods of dynamic peripheral binding, as disclosed herein, allow non-limiting exemplary smart card readers 110 (FIG. 1) to be dynamically bound to the local system 102 (FIG. 1) and the remote system 104 (FIG. 1) after a connection is established between the local system 102 and remote system 104. This allows peripheral devices such as a smart card reader 110 to be used both locally and remotely. Referring now to an alternative exemplary embodiment of remote peripheral binding in FIG. 6, a user can access a local system 102 and request further access to a remote system 104 via the local system 102 by inserting a smart card 112 (FIG. 1) in a smart card reader 110 bound to the local system 102. In block 410, the local system 102 receives the smart card.

Figure 6:
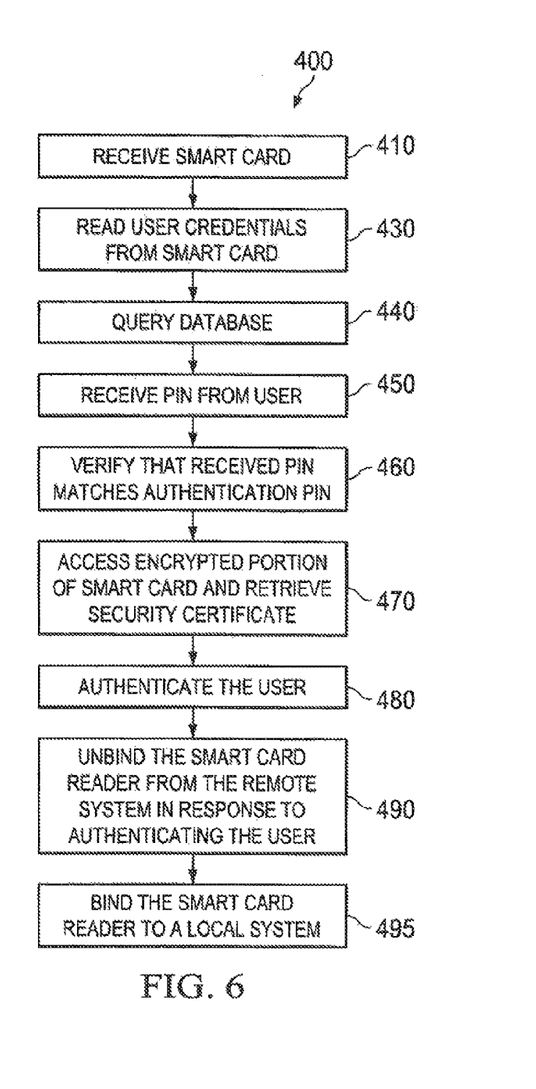
FIG. 6 is a flow diagram of an alternative exemplary embodiment of a method of dynamic remote peripheral binding employing a local system of FIG. 1 and a remote system of FIG. 1.

In block 430, the local system 102 extracts user credentials from the smart card 112. In one embodiment, a username can be extracted from the smart card 112 from an unencrypted portion of the smart card 112 data. In another embodiment, the local system 102 can extract and decrypt user credential data from the smart card 112. In block 440, the remote access client 116 (FIG. 3) queries a database to determine a remote system 104 (FIG. 3) with which to connect. Upon determination of a remote system 104 to which to connect, the local system 102 can display a user interface corresponding to an authentication screen, virtual desktop, user profile data, user preferences, or other data as can be appreciated from the remote system 104.

Accordingly, the remote access client 116 can create a remote session 121 (FIG. 3) as well as a remote peripheral session 128, which unbinds the smart card reader 110 from the local system 102 and binds the smart card reader 110 to a server based remote peripheral session 133 (FIG. 3) in a remote access server 132 (FIG. 1). Accordingly, the remote authentication engine 134 (FIG. 3) can extract user credential information from the smart card 112. The remote authentication engine 134 can then cause the remote access client 116 to generate one or more user interface elements requesting authentication information (e.g. a PIN, password, passphrase, etc.) from a user based upon user credential information extracted from the smart card 112. In block 450, the user can enter authentication information such as a PIN, which is received by the local system 102. In block 460, the remote authentication engine 134 can determine whether the received PIN is consistent with user credential information extracted from the smart card 112 for verification purposes.

In block 470, the remote authentication engine 134 accesses the smart card reader 110 and, using the entered PIN, unlocks the smart card 112 to access and/or extract a security certificate stored the smart card 112. In one embodiment, the unlocking may be performed cryptographically based upon the entered PIN, or other data as can be appreciated. In block 480, the local system 102 can authenticate the user with the extracted security certificate. In one embodiment, the local authentication engine can authenticate the user by querying an Active Directory Domain Controller, for example. In another embodiment, the local authentication engine can transmit the security certificate to the remote system 104, which can employ the remote authentication engine for user authentication.

In block 490, the smart card reader 110 is unbound from the remote system 104 upon authentication of a user as noted above, as the remote system 104 can terminate the server based remote peripheral session 133, and the remote access client can terminate the remote peripheral session 128, thereby releasing the smart card reader 110 from exclusive use. In block 495, the smart card reader 110 binds to the local system 102 system upon release by the remote access client 116 and remote access server 132. The user is then authenticated to access the local system 102 as well as computing resources of the remote system 104.

Figure 7:
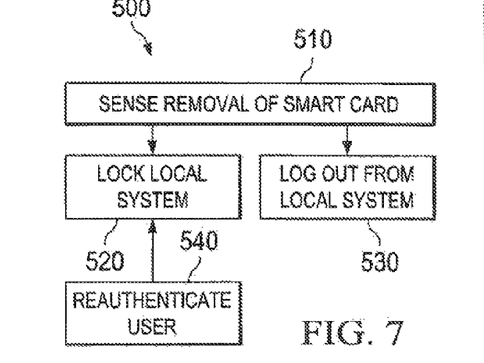
FIG. 7 is a flow diagram of an exemplary embodiment of local system of FIG. 1 and/or remote system of FIG. 1 behavior in response to smart card removal.

Referring now to FIG. 7, shown is one example of a method in accordance with an embodiment of the disclosure. The method 500 illustrates behavior of the local system 102 and remote system 104 upon removal of a smart card 112 from a smart card reader 110. In one embodiment, to terminate and/or suspend a remote session 121, a user may simply remove a smart card 112 from a smart card reader 110. Upon sensing smart card removal in block 510, the local system 102 can be figured to do one of the following, as non-limiting examples: 1) lock the desktop of the local system 102 in block 520; 2) log the user out from the desktop in block 530; and 3) do nothing. In block 520, a remote session 121 corresponding to a user can be maintained in the local system 102 and/or remote system 104, but the local system 102 and/or remote system 104 can require authentication to allow a user to resume the remote session 121. In block 530, a remote session 121 corresponding to a user can be terminated by the local system 102 and/or remote system 104. If the remote session 121 is terminated, then a user must establish a new remote session 121 as described above.

If the system has been configured to lock the desktop of a local system 102 in response to removal of a smart card 112 in block 520, then a user may use the same local system 102 or access a different local system 102 and insert his smart card. A user must then reauthenticate in block 540. Accordingly, the the local system 102 can unlock the desktop and the suspended remote session 121 resumed. Such functionality allows a user to lock a desktop on a local system 102, roam to another local system 102, present a smart card 112 and/or other authentication information, and resume the same remote session 121.

If the system has been configured to log out of the local system 102 in block and terminate the remote session 121, the user can use the same local system 102 or a different local system 102, and present his smart card 112 and/or other authentication information. The same process as previously described may be followed. The user must be reauthenticated and a new remote session 121 generated.

If the system has been configured to do nothing in response to removal of a smart card 112, the user can go to a different local system 102 and present his smart card 112 and/or other authentication information. However, on a different local system 102, in block 540, the user must establish a new remote session 121 and authenticate himself to the local system 102 and/or remote system 104.

The systems and methods of dynamic remote peripheral binding at connect/disconnect disclosed herein allow peripheral devices such as a smart card reader 110 (FIG. 1) and other plug and play devices to be dynamically bound from a local system 102 to a remote system 104 after a remote session 121 (FIG. 1) is established by a user. This allows peripheral devices to be used both locally and then remotely if desired.

The embodiments disclosed herein can be implemented in hardware, software, firmware, or a combination thereof. At least one embodiment disclosed herein may be implemented in software and/or firmware that is stored in a memory and that is executed by a suitable instruction execution system. If implemented in hardware, one or more of the embodiments disclosed herein can be implemented with any or a combination of the following technologies; a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The peripheral device logic may reside in memory as instructions which, when executed by a processor means, implement dynamic remote peripheral binding at connect/disconnect. The processor means may be, for example, a microprocessor, a microcontroller, a network processor, a digital signal processor, a reconfigurable processor, or an extensible processor as non-limiting examples.

The peripheral device logic may alternatively be implemented in hardware, including, but not limited to, a programmable logic device (PLD), programmable gate array (PGA), field programmable gate array (FPGA), an application-specific integrated circuit (ASIC), a system on chip (SoC), and a system in package (SiP). Furthermore, the peripheral device logic may be implemented as a combination of processor-executable software and hardware logic.

The flowcharts included herein show the architecture, functionality, and operation of a possible implementation of software. In this regard, each block can be interpreted to represent a software module, segment, or portion of code, which comprises one or more executable instructions for implementing the specified logical function(s). It should also be noted that in some alternative implementations, the functions noted in the blocks may occur out of the order and/or not at all. For example, two blocks shown in succession may in fact be executed substantially concurrently or the blocks may sometimes be executed in the reverse order, depending upon the functionality involved.

Any of the programs listed herein, which can include an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain or store the program for use by or in connection with the instruction execution system, apparatus, or device. The computer readable medium can be, for example, but not limited to, an electronic, magnetic, optical, electromagnetic, infrared, or semiconductor storage system, apparatus, or device. More specific examples (a nonexhaustive list) of the computer-readable medium could include a portable computer diskette (magnetic), a random access memory (RAM) (electronic), a read-only memory (ROM) (electronic), an erasable programmable read-only memory (EPROM or Flash memory) (electronic), a portable compact disc read-only memory (CDROM) (optical), a digital versatile disc read-only memory (DVD-ROM) and other storage media as can be appreciated. In addition, the scope of the certain embodiments of this disclosure can include embodying the functionality described in logic embodied in hardware or software-configured mediums.

One should also note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of this disclosure. Many variations and modifications may be made to the above-described embodiment(s) without departing substantially from the spirit and principles of the disclosure. All such modifications and variations are intended to be included herein within the scope of this disclosure.

What is claimed is:

1. A method comprising:
   binding a smart card reader to a local system, wherein the smart card reader is to extract data from a smart card;
   providing a prompt for authentication information associated with the smart card, wherein the smart card comprises credentials stored thereon;
   receiving the authentication information;
   conducting authentication operations to authorize access to the credentials;
   extracting the credentials from the smart card;
   establishing a connection with a remote system;
   unbinding the smart card reader from the local system such that the smart card reader is no longer available for use by at least a portion of the local system;
   binding the smart card reader to the remote system such that the smart card reader is available for use by at least a portion of the remote system; and
   establishing a remote session with the remote system.

2. The method of claim 1, further comprising employing the extracted credentials to conduct authentication operations with the remote system.

3. The method of claim 1, wherein conducting authentication operations to authorize access to the credentials comprises extracting a user name from an unencrypted portion of the smart card, querying a database for queried authentication information associated with the user name, and authenticating the received authentication information against the queried authentication information.

4. The method of claim 1, wherein the credentials are stored in an encrypted portion of the smart card.

5. The method of claim 4, wherein the credentials are at least one of: a security certificate, a private key, password, and pass phrase.

6. The method of claim 1, further comprising determining a remote system with which to establish a remote session from a plurality of remote systems.

7. The method of claim 1, further comprising:
   detecting a removal of the smart card; and
   employing a security measure, wherein the security measure comprises at least one of: suspending the remote session and terminating the remote session.

8. The method of claim 7, further comprising:
   detecting re-insertion of the smart card in the smart card reader; and
   providing a prompt for authentication information associated with the smart card.

9. The method of claim 1, wherein establishing the connection with the remote system comprises established an anonymous connection with the remote system.

10. A non-transitory computer readable storage medium comprising instructions which when executed cause a local system to:
    bind a smart card reader to the local system, wherein the smart card reader is to extract data from a smart card;
    provide a prompt for authentication information associated with the smart card, wherein the smart card comprises credentials stored thereon;
    receive the authentication information;
    conduct authentication operations to authorize access to the credentials;
    extract the credentials from the smart card;
    establish a connection with a remote system;
    unbind the smart card reader from the local system such that the smart card reader is no longer available for use by at least a portion of the local system;
    bind the smart card reader to the remote system such that the smart card reader is available for use by at least a portion of the remote system; and
    establish a remote session with the remote system.

11. The non-transitory computer readable storage medium of claim 10, wherein the connection is an anonymous connection.

12. A local system comprising:
    a smart card reader to receive a smart card, wherein the smart card comprises credentials stored thereon;
    at least one processor; and
    at least one memory comprising instructions, which when executed by the at least one processor, cause the local system to
       bind the smart card reader to the local system, wherein the smart card reader is to extract data from the smart card;
       provide a prompt for authentication information associated with the smart card;
       receive the authentication information;
       conduct authentication operations to authorize access to the credentials;
       extract the credentials from the smart card;
       establish a connection with a remote system;
       unbind the smart card reader from the local system such that the smart card reader is no longer available for use by at least a portion of the local system;

bind the smart card reader to the remote system such that the smart card reader is available for use by at least a portion of the remote system; and establish a remote session with the remote system.

13. The local system of claim 12, wherein the at least one memory comprises further instructions, which when executed by the at least one processor, causes the local system to employ the extracted credentials to conduct authentication operations with the remote system.

14. The local system of claim 12, wherein the credentials are stored in an encrypted portion of the smart card.

15. The local system of claim 14, wherein the credentials are at least one of: a security certificate, a private key, password, and pass phrase.

16. The local system of claim 12, wherein the at least one memory comprises further instructions, which when executed by the at least one processor, causes the local system to determine a remote system with which to establish a remote session from a plurality of remote systems.

17. The local system of claim 12, wherein the at least one memory comprises further instructions, which when executed by the at least one processor, causes the local system to detect a removal of the smart card; and employing a security measure, wherein the security measure comprises at least one of: suspending the remote session and terminating the remote session.

18. The local system of claim 12, wherein the connection is an anonymous connection.

* * * * *